Jan. 29, 1957 H. W. SCHUMANN 2,779,883
MOTOR TOOL
Filed Feb. 1, 1954 2 Sheets-Sheet 2
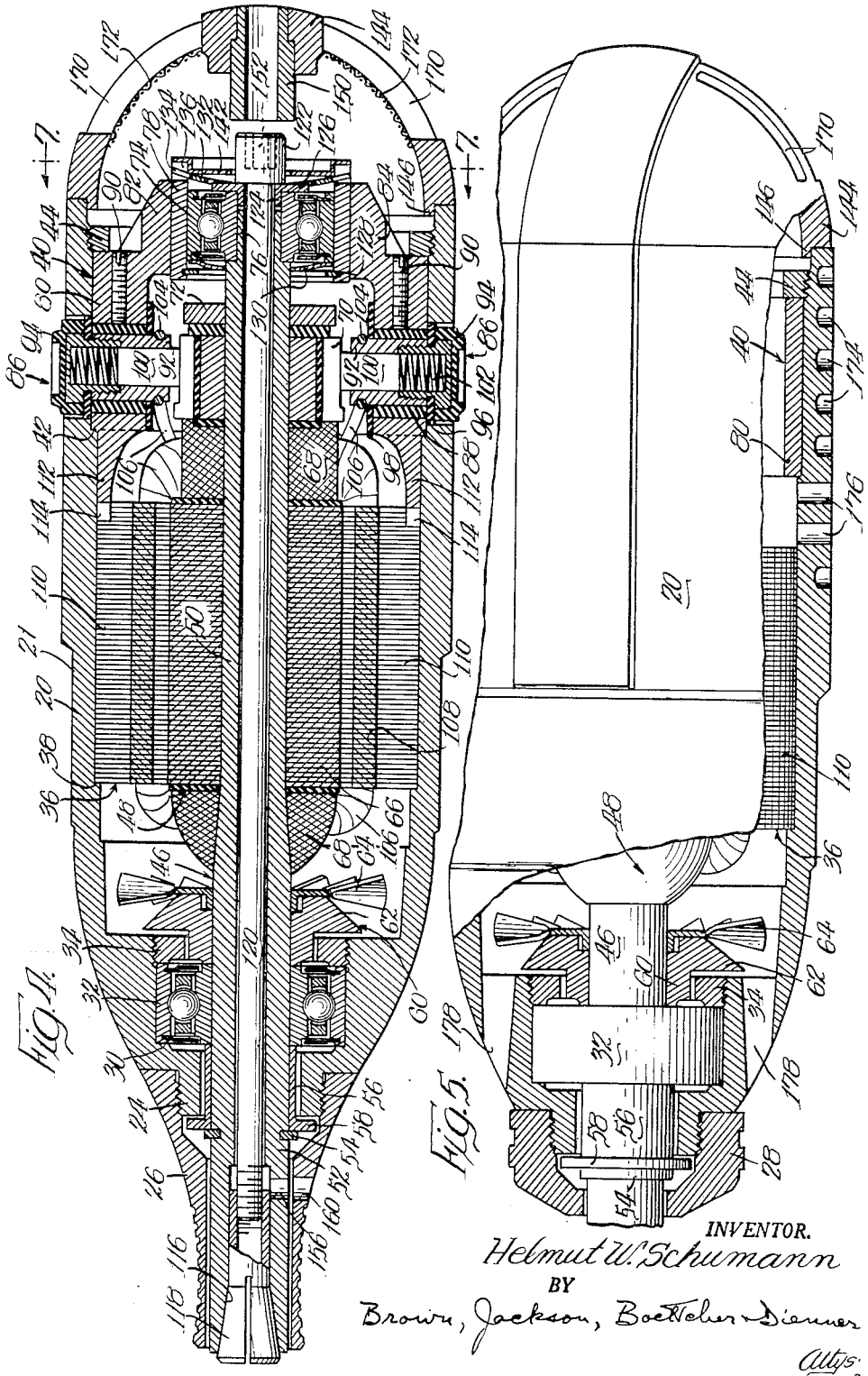
INVENTOR.
Helmut W. Schumann
BY
Brown, Jackson, Boettcher & Dienner
Attys.

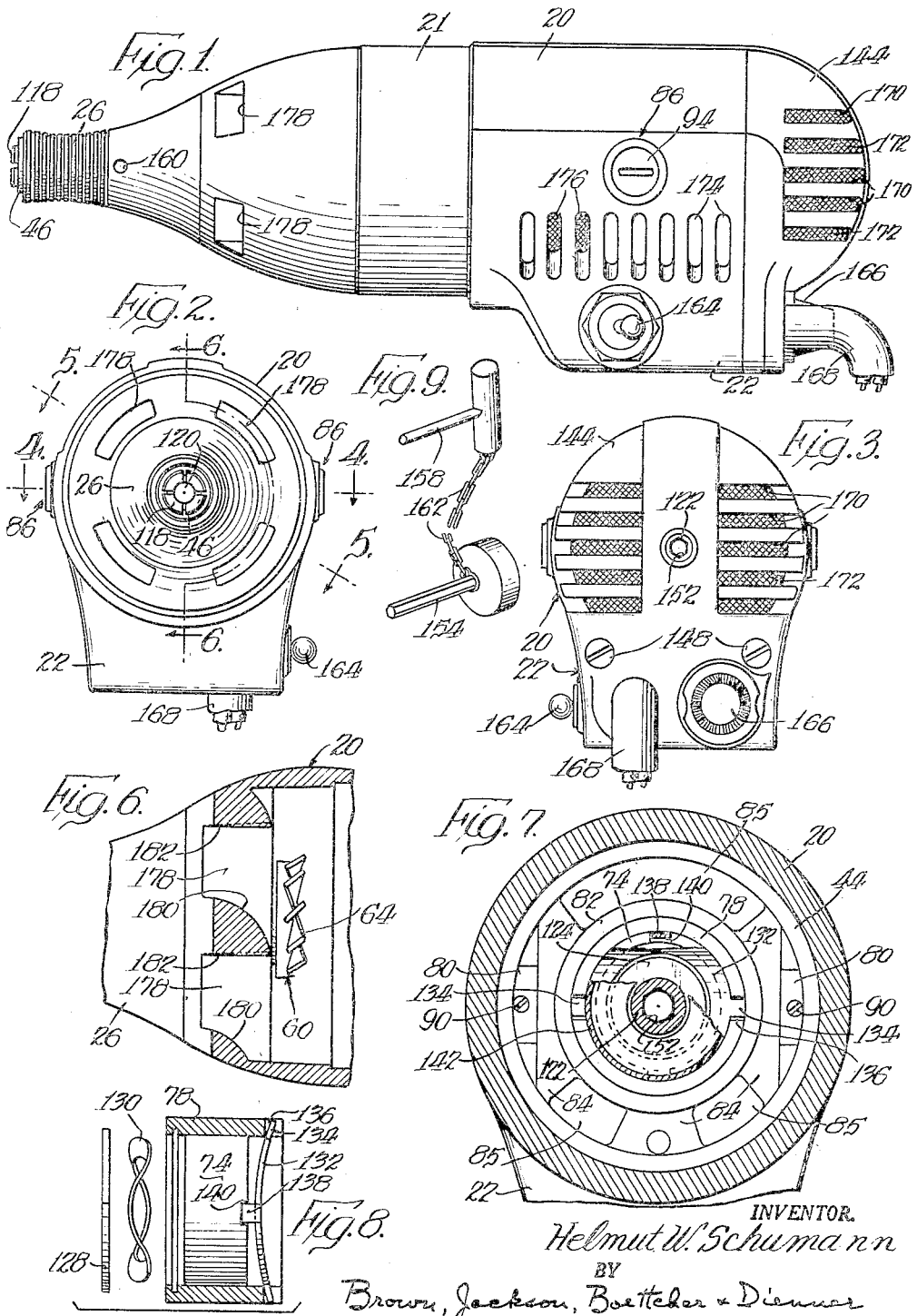

United States Patent Office 2,779,883
Patented Jan. 29, 1957

2,779,883
MOTOR TOOL

Helmut W. Schumann, Racine, Wis.

Application February 1, 1954, Serial No. 407,330

13 Claims. (Cl. 310—50)

The present invention relates to electric motor tools adapted to be held and guided by hand and to be used in conjunction with relatively small grinding wheels, milling tools, tungsten carbide bits, and other hard duty cutting or abrading bits of small size to perform precision machining and finishing operations.

In my Patent No. 2,532,823, issued December 5, 1950, and in my copending application, Serial No. 271,302, filed February 13, 1952, I have disclosed tools of the general character described. The present invention relates to the provision of a tool of smaller size, less weight, and more ready adaptability to hand use, intended to supplement rather than to replace the tools of my prior inventions.

The tools provided according to my earlier developments in the art are adapted for use both as held and guided by hand and as fixed in a stationary tool mount in conventional machines, such as lathes and the like, and in other machines that guide the tip or bit relative to the work, or vice versa. The tool of the present invention also lends itself to stationary mounting in the manner described, but is intended and constructed principally for hand use. To this end, it is a specific object of the present invention to provide a motor tool that is operable under load with substantial power, for example, one-fifth horsepower, and at extremely high speeds, in the order of 15,000 to 45,000 R. P. M., yet is light weight, such as 35 ounces, and of a size conveniently held in and manipulated by one hand by the tool operator.

To meet the desires of the art, it is necessary, in tools of the character defined, to satisfy a number of strongly conflicting requirements. The tool must have ample strength to stand up under rugged handling and the stresses of clamping in a machine rest with power feeding into the work. The accuracy of alignment of the parts must be continuously maintained. The dimensions and weight must be held to those which are convenient to hand operation or simple installation into existing machine tools. At the same time, ample power to perform the cutting, grinding and other operations must be incorporated in the tool. Yet, the tool must not be allowed to grow hot in the hands of the workmen, or to expose anyone to the danger of electrical shock.

A tool of this type is a tool room or production tool. That is, its normal function is the performance of an essential tool room or production operation. Stoppage of its operation idles the tool operator. Thus, the tool must be made to operate for long periods of time. Yet, with a tool operating at such high speeds, about 45,000 R. P. M., delicate dynamic balance is an essential requirement, for if unbalance occurs, the tool will not operate satisfactorily and will vibrate and tend to do unacceptable work. The vibrations may be so severe as to render the tool useless and, in many cases, to cause the tool to destroy itself. Thus, the tool must also have a very delicate balance. To construct a tool of this character which will stand up under severe use requires extraordinary accuracy and care in construction and assembly, the parts must be accurately made and assembled and accurately balanced, and said accuracy and balance must be maintained under the adverse conditions to which such tools are subjected.

It is an object of the present invention to provide an improved electric motor tool of the character described meeting all of the conflicting requirements above enumerated in a particularly effective and efficient manner and affording a high speed powerful tool readily manipulated by hand for precision machining and finishing work of the finest detail.

Another object of the invention is to provide a precision motor tool of the character defined comprising a housing of very exact manufacture, a shaft rotatably supported on accurate bearings in said housing, an accurately balanced motor armature mounted on said shaft, a field coil supported in and held against rotation within said housing, a fan mounted on said shaft for inducing air flow through said housing to cool the housing, the motor and said bearings, and a highly accurate bearing and brush mount disposed within said housing, all the parts being made and assembled to insure a compact and light weight structure.

A further object of the invention is the provision in a tool of the character defined of an internal tool holding chuck or collet and novel means for operating the same. In accomplishing this object, I provide, in the structure described, a hollow unitary shaft, comprising armature and quill portions, that is provided with a frusto-conical bore at the quill end thereof to define a tapered bore for the reception of a hollow taper collet, a tie rod threaded to the collet and extending through the hollow shaft to the opposite end thereof, the tie rod being engageable with the said opposite end of the shaft to draw the collet into the tapered bore, and abutment means on the tool housing engageable by the tie rod as the same is unthreaded with respect to the collet to force the collet out of binding engagement in the tapered bore. The provision of a hollow or tubular drive shaft, in addition to accommodating an internal collet and passage of the tie rod, affords particular advantage with respect to the lightness of the shaft and increased rigidity of the quill portion of the shaft. The provision of an internal collet affords a light weight structure wherein the bulk or size of the forward portion of the tool is reduced so that no obstruction is presented to visual observation and examination of the work and operation of the tool bit thereon. The utilization of a collet operating tie rod extending to the rear of the tool eliminates bulk and weight at the forward portion of the tool and affords a conveniently operated arrangement, particularly as regards automatic ejection of the collet.

A still further object of the invention is the provision in tools of the character described of highly efficient cooling for the housing, motor and bearings of the tool. In achieving this object, the fan described hereinbefore is provided to induce air flow through the tool from inlet ports at the rear of the tool through outlet ports adjacent the front of the tool. To insure an adequate air source, the entire rear cover of the tool is ported and, in addition, inlet ports are provided in the side walls of the tool housing. The fan is provided with a relatively great number of blades to induce a very rapid flow of air and the outlet ports are large and disposed immediately adjacent the fan to insure adequate discharge without obstruction. To avoid turbulence in the outlets, which would set up an obstruction to air discharge and which would usually set up an undesirable vibration, the outlets are especially designed in conjunction with the design of the fan blades to present a path of air flow directly related to the direction of air discharge from the fan. Also, the outlets are preferably offset with respect to the location of the motor brushes and other obstructions within the tool housing to insure high speed flow of air through the tool. In more conventional electric motors, the only path afforded for air flow is through the annular gap between the armature and field. In the tool of the present invention, this path is not fully adequate to accommodate the air flow found necessary to insure efficient cooling. According to the present invention, additional air passage between the motor armature and field is accommodated by slotting or deforming the outer periphery of the field to define longitudinally extending air ducts between the field and the tool housing. The provision of these ducts also leads to highly effective cooling of the tool housing whereby the same is easily and comfortably held in the bare hands of the operator. According to such design of the path of air flow, I am able to induce air flow at speeds up to 9,000 feet per minute, which insures a truly practical, efficient and highly effective cooling of the motor and tool housing.

In tools of the character described operating at speeds up to 45,000 R. P. M., the principal source of heat generation is not the motor as would normally be expected, but the bearings supporting the motor shaft and armature. Dissipation of the heat generated by the bearings and cooling of the bearings is essential to bearing life and to the overall object of affording a tool that will not grow hot in the hands of the workman.

It is an object of the invention to insure effective cooling of the shaft bearings in the cooling system structure as above described by mounting the bearings in metallic mounts of substantial bulk or section to absorb the heat from the bearings and by providing air ports in the metallic mounts to dissipate the heat by high speed air flow through the ports. In particular, according to the present invention, the shaft is supported by two bearings of very accurate manufacture, and the front bearing is disposed immediately adjacent the air outlet ports, said ports being disposed in an annular path about the bearing which is mounted in a portion of the tool housing of substantial section and the rear bearing is disposed in a special bearing mount or seat of substantial section that is provided with air ports or ducts disposed in an annular path about the bearing.

Due to the heat generated by the bearings and motor of the tool, even though effectively cooled as described, the shaft of the tool will be subject to thermal expansion and contraction. Due to the exact manufacture and balance of the tool, thermal variations in shaft length must be accommodated, or the balance and accuracy of the tool would be destroyed. Specifically, it is an object of the present invention to accommodate thermal expansion and contraction of the tool shaft by accommodating relative sliding movement of the rear bearing. The outer race of the front bearing is locked in the tool housing and the shaft is locked to the inner race of the front bearing to insure rigid mounting and stability of the quill portion of the shaft. The shaft is also locked to the inner race of the rear bearing, but the outer race of this bearing is slidable in its mount, whereby thermal expansion and contraction of the shaft are accommodated by sliding movement of the rear bearing axially with respect to its seat.

While the bearings employed in the tool of the present invention are necessarily of the most exact or accurate manufacture, even these bearings accommodate some end play and rigid connection of the tool shaft to the front bearing will not entirely eliminate undesirable end play of the shaft. To eliminate shaft end play, it is an object of the invention to prestress the bearings of the tool to insure optimum shaft rigidity and stability. More particularly, it is an object of the invention to prestress both bearings of the tool, that is, all bearings of the tool, by a single spring. In the preferred construction, a spring is confined between the slidably mounted outer race of the rear bearing and a stationary portion of the tool housing continuously to bias the rear bearing and the tool shaft as carried thereby to the rear of the tool whereby both the front and rear bearings are prestressed. Also, prestressing of the bearings toward the rear of the tool insures location of the quill portion of the shaft at its rearwardmost position, whereby engagement of a tool carried by the shaft with a work piece will not result in overcoming the original prestressing of the bearings.

As referred to above, it is a substantial advantage in the tool of the present invention slidably to mount the rear bearing of the tool shaft. However, the outer race of this bearing should be held against rotation with respect to its seat to insure proper bearing wear and preserve its useful life. I have found in actual practice that customary structural arrangements for preventing relative rotation while accommodating relative axial movement, wherein the periphery of the bearing would be deformed, slotted, or the like, are not practical for the reason that deformation of the bearing results in uneven heat transmission which leads to unevenness in the bearing. It is an object of the present invention to provide a novel retaining means for the outer race of the rear bearing of the tool shaft wherein slotting or other deformation of the peripheral surface of the bearing is eliminated. In particular, I provide retaining means comprising an annular spring having radial arms receivable in slots in the stationary bearing mount and second arms extending axially from the periphery thereof for reception in small indentations provided in one end face of the outer race of the rear bearing, whereby the peripheral surface of the bearing and cylindrical wall of the seat in which the bearing is received are not interrupted and not subject to localized hot spots or the like, thus to insure uniformity of the bearing races and the provision of smooth running bearings irrespective of the heat generated thereby.

Other objects and advantages of the present invention will become apparent in the following detailed description of a preferred embodiment of the invention.

Now, in order to acquaint those skilled in the art with the manner of making and using the tool of the present invention, I shall describe, in connection with the accompanying drawings, a preferred embodiment of the invention and one manner of manufacturing the same.

In the drawings:

Figure 1 is a side elevation of the improved motor tool of the present invention;

Figure 2 is a front elevation of the tool;

Figure 3 is a rear elevation of the tool;

Figure 4 is a longitudinal horizontal section of the tool, on an enlarged scale, the view being taken substantially on line 4—4 of Figure 2;

Figure 5 is an oblique fragmentary view of the tool, partly in section and partly in elevation, showing the air inlets and outlets of the tool, the sectional part of the view being taken substantially on line 5—5 of Figure 2;

Figure 6 is a sectional layout view of the forward portion of the tool showing the air outlets, the view being taken substantially along line 6—6 of Figure 2;

Figure 7 is a cross sectional view taken adjacent the rear bearing of the tool, substantially on line 7—7 of Figure 4;

Figure 8 is a partially exploded side view of the principal parts of the rear bearing assembly of the tool; and Figure 9 is a perspective view of the collet or chuck operating instruments of the tool of the invention.

Referring now to the drawings, the tool of the present invention is shown as including a housing 20 which is generally cylindrical, and is tapered inwardly at the forward end thereof to define a nose portion, and at the rearward end thereof includes a depending switch and fuse housing 22. As shown in Figure 4, the housing 20 is an integral metallic casting, preferably die cast from aluminum or the like, and at the forward end thereof includes a tubular portion 24 having an external thread for the detachable reception of a tubular nose piece or chuck cap. The chuck cap may be relatively long, as indicated at 26 in Figures 1 and 4, or may be relatively short, as indicated at 28 in Figure 5. The interior of the housing 20 is provided with a cylindrical stepped bore that is machined in a single operation to insure perfect concentricity. Starting at the forward end of the housing, the first bore therein defines the tubular portion 24 and the second bore defines a bearing cavity, the shoulder between the two bores being stepped adjacent the peripheral margin thereof to define an axially projecting abutment 30. The bearing cavity is adapted for the reception therein of a ball bearing 32, which is of a most exact and accurate manufacture. The outer race of the bearing 32 is intimately received within the bearing cavity in the housing 20 and at the forward side or end wall thereof engages the abutment 30 in the housing, and the outer race of the bearing is positively locked in the cavity against rotation with respect to the housing 20 by a stepped locking ring 34 threaded into the said second bore in the housing, and engaging solely the outer race of the bearing. The third bore in the housing 20 is of a considerably greater diameter than the second bore, and together with the fourth bore, provides a fan enclosure as will be described in detail hereinafter. The fifth bore is adapted for the reception of a motor field structure or coil 36, the same abutting against and being located by means of the step or shoulder 38 between the fourth and fifth bores in the housing 20. The forward portion of a bearing seat or bearing and brush mount member 40 is also received in the fifth bore, and this member presents a stepped periphery mating with the fifth and sixth bores and the shoulder 42 therebetween, the member 40 being locked in the housing by an annular locking ring 44 threaded into the sixth bore of the housing adjacent the rearward end thereof.

The housing 20 is adapted for the reception and rotatable support of a rotary assembly including the tool shaft 46 and the motor armature 48. The shaft 46 includes an armature portion on which the armature 48 is mounted to operate and be located within the field structure or coil 36, and at the forward end thereof includes a quill portion 52. The quill portion 52 of the shaft 46 is preferably of a slightly larger diameter than the armature portion thereof to insure rigidity and the same is mounted in and locked to the inner race of the forward bearing 32. In particular, the quill portion of the shaft is circumferentially grooved forwardly of the tubular portion 24 of the housing for the detachable reception of a retaining ring 54 in the character of a C-ring. A quill spacer sleeve 56 abuts against the ring 54 and the same includes a radial flange 58 disposed immediately adjacent the front end of the tubular portion 24 of the housing to define therewith a slinger sealing the bearing 32 from air flow at the forward side thereof. The sleeve 56 extends inwardly into the housing 20 through the tubular portion 24 thereof, and at its inner end abuts against the inner race of the bearing 32 to confine the inner race between the sleeve and the stepped face of a slinger 60 which is press fitted on the shaft 46. Thus, the shaft 46 and the inner race of the bearing 32 are positively locked together, and the outer race of the bearing 32 is locked in the housing 20, whereby the tool shaft is retained against substantial axial movement with respect to the housing 20.

The slinger 60 includes a tubular portion fitting withing the locking ring 34 and a radial flange 62 disposed immediately adjacent the rear face of the ring 34 and the shoulder between said second and third bores of the housing to define therewith an air seal for the bearing 32. The peripheral surface of the flange 62 of the slinger 60 is preferably tapered inwardly of the tool to the base circle of the blades of a fan 64 which is press fitted on the shaft 46 and includes a hub portion received within a counterbore in the slinger. The fan 64 is preferably a metallic stamping having a relatively large number of blades bent from the plane thereof to induce flow of air through the tool at high speed. Immediately inwardly of the fan 64, the tool shaft 46 is tapered downwardly, between the quill and armature portions thereof, to lighten the weight of the shaft and afford a mounting for the armature 48 of the motor.

The motor armature 48 comprises the usual metallic laminations 66 and their associated winding 68 mounted on and secured to the shaft 46. To the rear of the laminations and winding of the armature, a commutator 70 is secured to the shaft, and immediately to the rear of the commutator, a balancing ring 72 is secured to, suitably by a press fit, the shaft 46. The balancing ring 72 is preferably formed of metal and is adapted to be drilled where necessary to accommodate dynamic balancing of the rotary assembly of the tool, as will be described hereinafter. To the rear of the balancing ring 72, the tool shaft 46 is stepped to provide a shoulder against which the inner race of a ball bearing 74 is adapted to abut, the bearing slidably receiving the reduced rearward stem portion 76 of the shaft which terminates within the bearing. The outer race of the bearing 74 is mounted within a metallic sleeve 78 for free floating axial movement to accommodate axial movement of the shaft 46, consequent upon thermal expansion and contraction of the shaft, with respect to the housing 20. The sleeve 78 is received within the metallic bearing seat or block 40, the same preferably being press fit into the seat or block. The bearing seat 40 comprises an outer annular cylindrical portion 80 which is received intimately within the said sixth bore in the housing 20 and abuts at the forward side thereof against the shoulder 42 in the housing. At the rearward end thereof, the block 40 includes an inner annular cylindrical portion 82 which is joined to the outer portion 80 by a plurality of spider legs 84, as is shown in Figure 7. Due to the formation thereof, a plurality of air ports 85 are provided in the seat 40 disposed in an annular path about the inner cylindrical portion 82 and the rear bearing 74. The seat 40 is accurately formed and machined to have the outer cylindrical surface of the portion 80 and the inner cylindrical surface of the portion 82 thereof concentric, whereby the bore in the portion 82 is perfectly concentric with the bores in the housing 20. The sleeve 78 is secured, suitably by press fit, in the bore of the portion 82 of the seat, so that the rear bearing 74 is disposed in axial alignment with the front bearing 32 to support the shaft 46 with perfect accuracy.

The outer cylindrical portion 80 of the bearing seat 40 is provided with diametrically opposed radial bores therein which align with complemental bores provided in the housing 20 when the seat 40 is assembled in the housing. Preferably, the bores in the housing are disposed at the sides of the tool, as shown in Figures 1 and 3. The aligned bores in the housing and seat at each side of the tool are adapted for the reception of a motor brush assembly 86, each of which assemblies comprises an insulating sleeve 88 fitted into the respective bore in the seat 40 and held therein by a set screw 90, a conductive brush guide 92 secured in the sleeve 88 and extending beyond the radially inward end thereof, and having a threaded outer end portion for the detachable reception of a brush cap 94, the cap 94 being readily accessible through the bores provided in the sides of the housing 20. A rubber washer 96 is confined between the cap 94 and guide 92, and an insulating washer 98 is fitted on the inner end of the guide. A brush 100 is slidably mounted in the guide 92, and a spring 102 is confined between the brush and cap for biasing the brush into engagement with the commutator 70. At the inner ends thereof, the guides 92 of the brush assemblies are provided with a circumferential groove adapted for the detachable reception of wire clips 104 constituting the terminals, respectively, of the motor field winding 106. Due to the provision of the brush assemblies and the clips 104 the assembly of the components of the motor is greatly facilitated, and replacement and repair of the various parts is readily accommodated.

The motor field 36 comprises the usual laminations 108 and winding 106, but at the opposite sides thereof, at diametrically opposed points, the laminations are deformed or slotted to form depressions defining a pair of longitudinally extending ducts 110 between the field structure 36 and the housing 20. The field is relatively loosely received within the housing 20, and at the forward end thereof abuts against the shoulder 38 in the housing. At the rearward end thereof, the field is held against substantial axial displacement by a pair of diametrically opposed longitudinally extending projections 112 formed integrally with the bearing seat 40, which abut against the rearward end of the field structure, and against rotational movement with respect to the housing by a pair of reduced tips 114 formed on the projections 112 and fitting within the respective ducts 110 in the field structure.

The shaft 46 of the tool comprises a hollow or tubular member to increase the rigidity of the same, while at the same time decreasing its weight. The provision of a hollow shaft also accommodates an internal collet or chuck, so that the bulk or size of the tool adjacent the work may be substantially reduced as compared to prior structures. To accommodate an internal tapered chuck or collet, the shaft 46 is provided at the forward end thereof with a relatively long internal taper defining a frusto-conical or tapered bore 116 adapted for the reception of a hollow taper collet or chuck 118. As is conventional, the collet is slotted through the wall thereof at spaced points at the outer end thereof to accommodate expansion and contraction of the mouth of the collet, whereby the same is adapted for the reception, clamping and release of various tools. At its inner end, the hollow or tubular collet 118 is provided with an internal screw thread for the reception of the threaded forward end of a tie rod or screw 120. The tie rod extends axially through the shaft 46 and at its rearward end is provided with a head 122. Adjacent its head, the rod 120 carries an accurately machined locating washer 124 which includes a tubular stem receivable in the inner race of the bearing 74, to support the rod and accurately locate the same coaxially of the shaft 46, and a radial flange 126 engaging the rear face of the inner race of the bearing 74. Rotation of the tie rod in a direction to thread the same into the collet 118 results in the exertion of a compressive force on the shaft 46 to draw the collet into binding or locking engagement in the tapered bore 116 at the forward end of the shaft, thus to compress the slotted portions of the collet whereby the same will grip the shank of a suitable tool inserted therein. At the same time, the head of the tie rod, through the locating washer, will exert a clamping force on the inner race of the bearing 74 to lock the shaft 46 and the inner race of this bearing together, the inner race of the bearing being confined between the step or shoulder on the shaft and the flange 126 of the washer 124. Accordingly, it will be appreciated that the rotary asesmbly of the tool of the invention comprises the shaft 46, the armature 48, the ring 54, the sleeve 56, the inner race of the bearing 32, the slinger 60, the fan 64, the commutator 70, the balancing ring 72, the inner race of the bearing 74, the collet 118, the tie rod 120, and the locating washer 124. In practice, the assembly of the shaft, armature, slinger, fan, commutator and balancing ring is dynamically balanced to an exact degree to insure the necessary balance at high speeds as referred to hereinbefore, balance of the assembly being attained by drilling out suitable portions of the balancing ring 72 and the front face of the flange 62 of the slinger 60. The other components of the rotary assembly are accurately made and assembled, and due to the lightness thereof and/or the proximity thereof to the axis of rotation, the resultant assembly is very exactly balanced.

As shown in Figure 4, the bearings 32 and 74 each include a shield at either side of the balls thereof extending from the outer race to a point adjacent the inner race to protect the bearings from contamination. However, with high speed air flow through the tool, as will be described hereinafter, the protection afforded by the shield is not fully adequate, and I prefer to further shield the bearings by slingers. The front bearing 32 is shielded at both sides by the slingers 58 and 60 as described hereinbefore. At the rear bearing, complete shielding is desired only in the direction of air flow and to afford such shielding, I form the radial flange 126 of the locating washer 124 of a diameter greater than the inner diameter of the bearing shield, whereby this rotating flange is disposed immediately adjacent the stationary portion of the bearing to constitute therewith a slinger.

The bearings 32 and 74, while of very exact construction, accommodate a slight amount of end play so that the shaft, due to its rigid connection to the inner races of the bearings, would normally be subject to end play. Even though the play would be very slight, it would be disadvantageous, and I eliminate this play entirely by prestressing the bearings. As will be appreciated from the foregoing, the shaft and other parts of the rotary assembly are fixed in axially related position within the housing 20 solely by the fixed relation of the two races of the front bearing 32 to the shaft and housing, respectively. It is, therefore, this bearing which should principally be prestressed. However, the rear bearing 74 should also be stressed to eliminate undue play or travel of the outer race in the bearing sleeve 78. As shown in Figure 4, the bearing sleeve 78 is longer than the bearing 74 to extend beyond both sides of the bearing. At the inner end thereof, the inner wall of the sleeve is grooved for the reception of a resilient C-ring 128 or the like which constitutes an abutment for a spring washer 130 confined between the ring 128 and the outer race of the bearing 74. In other words, the spring 130 effectively is confined between a stationary portion of the housing 20 and the outer race of the bearing 74. The spring 130 is shown in detail in Figure 8 as comprising a wave washer formed of resilient or spring steel or the like. The washer normally biases the outer race of the bearing 74 toward the rear of the tool to retain the outer race against any axial movement other than that necessitated by thermal expansion and contraction of the shaft 46. In biasing the outer race rearwardly, the spring 130 stresses the bearing 74 to eliminate end play between the races thereof, and biases the inner race of the bearing rearwardly normally to bias the shaft 46 rearwardly, whereby the front bearing is prestressed due to the spring force exerted in effect between the two races thereof. Thus, a single spring stresses both bearings, eliminates undue axial movement of the outer race of the rear bearing and accommodates such movement of the rear bearing as is necessary to accommodate thermal variations in shaft length relative to the housing. Also, the spring is effective to prestress both bearings in a direction to bias the shaft rearwardly in the housing, which is the proper direction since force exerted on a tool bit in performing work is in this direction, so that the prestress afforded by the spring is not overcome or eliminated in use of the tool.

In both bearings, optimum wearing characteristics are afforded only when the relative rotation between the housing and shaft is restricted solely to relative rotation of the inner and outer races of the bearing on the balls or other anti-friction means therebetween. The front bearing readily meets this requirement, since the inner and outer races are clamped, respectively, to the shaft and to the housing. The inner race of the rear bearing is clamped to the shaft 46, but the outer race thereof being slidable with respect to the housing requires, in an optimum design, means for preventing relative rotation of the outer race and the housing. However, conventional means to accomplish this end are not satisfactory, for the reason that the same require the provision of a rib, slot, pin, or the like on the peripheral surface of the bearing. In a high speed tool, the bearings generate the majority of the heat of the tool, and the existence of any deformation along the peripheral surface of the bearings results in localized hot spots, which in turn result in an uneven or "bumpy" bearing action. To overcome the disadvantage of conventional retaining means, I provide a novel retainer for the outer race of the rear bearing comprising, as shown in Figures 4, 7 and 8, an annular retaining spring 132 having a pair of diametrically opposed radial arms 134 slidably received in slots 136 provided in the bearing sleeve 78 at the rearward end thereof and a pair of diametrically opposed fingers 138 extending axially from the periphery of the spring and receivable in recesses 140 provided in the rear face of the outer race of the bearing 74. The fingers 138 are preferably offset 90° from the arms 134, and the spring is bowed transversely of the plane thereof to impart springiness thereto and insure connection between the outer race of the bearing 74 and the stationary bearing sleeve 78 regardless of the axial position of the bearing 74. Since the retaining spring 136 engages only in recesses or depressions which are provided on the rear end face of the bearing 74, the peripheral surface of the bearing is continuous and uniform, so that any danger of localized hot spots or the like is completely eliminated. To hold the retaining spring 132 within the sleeve 78, as shown in Figure 4, an annular cap 142 having a depressed central portion is detachably pressed into the rearward open end of the sleeve 78. The cap 142 is centrally apertured, as shown, to accommodate the passage therethrough of the head 122 of the tie rod 120, but the same preferably overlies the slinger flange 126 of the locating washer 124 to provide a thoroughly effective air seal for the rear bearing 74.

From the foregoing, it will be appreciated that the rearward end of the tool shaft 46 is supported by a bearing assembly comprising the bearing seat 40, the bearing 74, the sleeve 78, the ring 128, the spring 130, and the retainer 132. The essential components of this assembly are shown in Figure 8, and the assembly affords the several advantages of prestressing all of the bearings of the tool, of biasing the tool shaft toward the rearward end of the housing to eliminate end play upon engagement of a tool carried by the shaft with a work piece, accommodates whatever axial expansion and contraction of the shaft with respect to the housing may take place, and retains the outer race of the rear bearing against rotation with respect to its stationary seat.

As will be appreciated from Figures 4 and 7, the housing 20 of the tool of the present invention, as excluding the switch and fuse housing 22, comprises a complete cylindrical housing member which is open at the rearward end thereof to accommodate the assembly therein of the various components of the tool as thus far described. The open rearward end of the tool housing is preferably closed by means of a cover 144 conforming to the configuration of the housing 20 and the switch housing 22. The cover includes an annular reduced axially extending flange 146 extending into the open end of the cylindrical housing 20 to locate the cover with respect to the housing, and the cover is detachably secured to the housing by a pair of screws 148 threaded into the housing. At its central portion, the cover 144 is apertured and a tubular stem 150 is secured to the cover to extend axially into the housing adjacent the head 122 of the tie rod 120. The stem 150 constitutes an access passage to the tie rod head 122 and this head is provided with a hexagonal or other polygonal socket 152. The tie rod is adapted to be rotated by means of a wrench 154, shown in Figure 9, having a cross section complemental to the socket 152, which is extensible through the stem 150 into the socket 152. To retain the tool shaft 146 stationary upon actuation of the collet operating tie rod 120, to accommodate release of the collet, a radial bore 156 is provided in the shaft adjacent the forward end thereof to accommodate holding of the shaft by means of a holding tool 158 insertable in the bore 156. When the short collet cap 28 is used, the bore 156 is exposed, but with the long cap 26, it is necessary to provide a bore 160 in the cap with which the bore 156 in the shaft is adapted to be aligned to accommodate insertion therein of the tool 158. The tool 158 and wrench 154 are preferably connected by a chain 162 or the like, so that both instruments are readily located when it is desired to operate the collet. The instruments 154 and 158 are preferably not normally associated with the tool at all, but are brought into association with the tool, in the manner described, only when the collet is to be operated. Due to the structural relation of the cover 144, tie rod 120 and collet 118, the collet cannot inadvertently be opened and cannot be tampered with so that complete safety in use of the tool is assured.

When opening the collet to replace a cutting bit, the shaft holding tool 158 is inserted in the bore 156 of the shaft and held in one hand by the operator. With his other hand, the operator inserts the wrench 154 through the stem 150 and into the socket 152 in the head of the tie rod 120. The wrench is then rotated, conveniently by the knob attached thereto, to unthread the tie rod with respect to the collet. Due to the long taper of the bore 116, which assures the tool holding action of the collet, the collet will normally stick in the bore and as the tie rod is unthreaded the same moves rearwardly until the head 122 thereof abuts against the inner end of the stem 150. Thereafter, further unthreading of the tie rod with respect to the collet will result in automatic ejection of the collet to accommodate removal of one bit and association of a new bit with the tool. When the new bit is inserted in the collet, the wrench is operated to thread the tie rod into the collet whereby the collet is drawn into firm locking engagement in the tapered bore 160 to compress the slotted outer end portion thereof positively to lock the cutting bit to the tool shaft. This action also results, of course, in positive locking of the inner race of the bearing 74 to the tool shaft 46. Thereafter, the instruments 154 and 158 are removed from the tool, and the tool and collet will be free of tampering and inadvertent adjustment.

The housing 20 comprises a complete cylindrical shell from one end to the other thereof, as pointed out hereinbefore, and the housing 22 defines a separate cavity for the motor switch and fuse. In particular, the housing portion 22 is provided with a bore in one wall thereof for the passage of the operating stem of an on-off toggle switch 164. A cartridge-type fuse is also receivable within the housing 22 and is accessible from the exterior of the tool by means of a cap 166 detachably associated with the cover 144. The electrical conductor 168 for the tool extends through the cover 144 and the wiring of the fuse, switch, brushes, armature and field of the electric circuit of the motor within the housings 20 and 22 is conventional.

The manufacture and assembly of the tool of the present invention, as will be appreciated from the foregoing, requires a very high degree of accuracy and precision and the resulting product is a machine tool of delicate balance, that is, nevertheless, adapted for strenuous and prolonged use. The tool is of small size and operates at very high speeds to afford a hand-manipulated tool adapted for use by the highly skilled craftsman and technician in the performance of machining and finishing operations of the finest detail. In a commercial embodiment, the tool operates under load at speeds up to 45,000 R. P. M. and at a rating of one-fifth horsepower; the overall length of the tool is 7 and 9/16 inches, the diameter forwardly of the switch housing is 2.125 inches, the depth at the switch housing is 2 and 7/8 inches; and the total weight of the tool is 35 ounces. The uses to which a tool of these desired operational and dimensionsal characteristics can optimumly be put are beyond enumeration.

Due to the provision of an internal collet, a small diameter tubular shaft, extension of the shaft beyond the forward end of the housing, and an inwardly tapered nose portion on the housing, the forward end of the tool and tool shaft, at which the cutting bit is secured, is small so that no obstructions are presented to visual observation and examination of the cutting bit and the work piece upon which operations are being performed. The long chuck or collet cap 26 enhances the appearance of the tool without substantially increasing the size or bulk of the tool immediately adjacent the collet. However, in cases where access to the interior of small cavities and the like is desired, the short chuck or collet cap 28, as shown in Figure 5, accommodates entry of the tool shaft to smaller apertures than would be accommodated by the long chuck cap 26. Also, if desired, the chuck cap may be entirely eliminated, but such elimination would have the disadvantage that the rotating slinger flange 58 and C-ring 54 would be exposed. As pointed out hereinbefore, the tool of the present invention is principally designed for hand use. However, because of its small forward end, its precision, power and high speed, the tool is also particularly well adapted for utilization in stationary mounts for association with machines wherein the work is advanced into engagement with the cutting bit, or vice versa. To accommodate association of the tool of the present invention with stationary tool mounts, I preferably accurately machine a cylindrical peripheral surface of the tool housing 20 forwardly of the switch housing 22, as is indicated at 21 in Figure 1. Also, the exterior thread on the tubular nose portion 24 of the housing 20 is adapted for threaded association in a mount so that the tool can be firmly held at spaced points in the mount. In view of these various factors, it will be appreciated that the tool of the present invention is adapted for an extremely wide variety of machining and finishing operations in production work requiring the utmost precision.

In a tool operating at the high speeds above referred to, 45,000 R. P. M., substantial heating of the component parts of the tool is a natural consequence and dissipation of the heat and cooling of the tool is essential, particularly in view of its intended use principally of a hand-manipulated tool. As will be appreciated from the foregoing, the fan 64 is intended to induce a flow of cooling air through the tool, the flow being from the rear to the front of the tool and the principal components to be cooled being the bearings 32 and 74, the motor 36, 48 and the housing 20, principally in that order. The flow of air cannot be merely a relatively low volume, low speed flow, for this would not provide an effective cooling action, and to afford an effective cooling action special design is preferably resorted to as will be described hereinafter. To afford an adequate air source, the entire surface of the rear cover 144 of the tool is ported by providing slots 170 therein. Preferably, these slots are screened over, as indicated at 172, to prevent entry of particles of dust and the like. Communication between the rear cover 144 and the interior of the housing 20 is established by the ports 85 provided in the bearing seat 40, the ports being of a size to accommodate substantial air flow. Also, the bearing seat 40 is of substantial section so as readily and rapidly to absorb and transmit heat from the bearing 74. The ports 85 are disposed to expose substantial areas of the seat 40 to air flow so that the heat absorbed thereby from the bearing is rapidly dissipated prior to substantial transmission of heat to the housing 20. Thus, the rear bearing 74 will, upon substantial air flow as will be described, be effectively and efficiently cooled. Continued air flow from the rear bearing seat, results in passage of cooling air over the brushes and commutator of the motor assembly and from thence to the annular gap between the armature and field of the motor. The side walls of the housing 20 adjacent the bearing seat are indented at several places, as indicated at 174, to accommodate some exterior air cooling by exposure of a large surface area. To insure a fully adequate air supply and an additional supply of cool air inwardly of the rear bearing 74, some of these indentations may be slotted entirely through the wall of the housing to admit air between the bearing seat and the motor. As specifically shown in Figure 5, I prefer to slot the housing at two of the indentations 176 located between the field structure of the motor and the portion 80 of the bearing seat at both sides of the housing. These ports may be screened if desired, as indicated in Figure 1, and will be located below the bearing seat projections 112 so that no obstruction to air inlet is presented. Air flow through the side ports 176 affords additional cooling air for the motor, to flow through the annular gap between the armature and field to insure effective cooling of the motor. Also, the ducts 110 formed in the field laminations 108 accommodate high speed air flow between the field of the motor and the housing 20 to cool both the field structure and the housing. High speed air flow in the path thus far described is induced by the fan 64 and to insure effective air flow, the fan preferably has a large number of efficiently designed blades. In the commercial embodiment referred to hereinbefore, the fan presents 16 blades, which affords a highly efficient forced air cooling effect.

The air outlet ports in the housing are preferably disposed immediately adjacent the discharge side of the fan and in an annular path about the bearing. The quill portion of the tool shaft does not require any appreciable degree of cooling, but the bearing therefor does. To afford an effective cooling of the bearing, I mount the same in a portion of the housing 20 having substantial section, so that heat generated at the bearing is rapidly absorbed and transmitted by the metal of the housing. I provide a plurality of outlet air ports 178 in this portion of the housing to dissipate heat therefrom. In particular, the outlet ports 178, as shown in Figure 4, are disposed immediately outwardly of the slinger 60 forwardly of the fan 64 and extend forwardly for the full length of the bearing 32. The housing 20 tapers inwardly adjacent the bearing and the outlet ports extend substantially longitudinally through the tapered portion of the housing to open in the frontal surface of the tool. In actual practice, I have found that the air outlets should be designed in view of the fan design, for if merely longitudinal openings are provided, turbulence is created in the outlet ports which obstructs efficient air flow and may even set up undesirable vibration. To guard against this disadvantage and to insure the most effective flow of cooling air, I specifically design the outlet ports in relation to the path of air discharge from the fan. As will be appreciated, air discharge from the fan will be substantial normal to the fan blades. More specifically, air discharge from the fan will be a component principally of two forces, force tangentially of the fan and force longitudinally of the fan forwardly thereof. In view of the direction of air flow, I taper the outlet ports to conform substantially to the air flow pattern. In particular, as shown in Figure 6, the side wall of each outlet port first encountered in the direction of fan rotation is curved or inclined as indicated at 180, to define, generally, a passage inclined to the longitudinal axis of the tool and extending substantially normal to the fan blades. Since the housing 20 of the tool of the present invention is preferably die cast, as pointed out hereinbefore, problems of core withdrawal will not permit formation of the outlet ports in truly inclined relation to the longitudinal axis of the tool, but by providing the inclined or curved walls 180 and the substantially straight wall 182 opposite thereto, the same effect is achieved and the housing is manufactured in the most efficient manner.

Due to the particular formation of the various air passages, and fan, as described hereinbefore, I am able to induce, in the commercial embodiment of the tool above referred to, cooling air velocities up to 9,000 feet per minute, which affords a truly effective cooling of all components of the tool, whereby the tool may be held in the bare hands of the operator and operated for long periods of time without overheating or becoming too hot to handle.

From the foregoing, it will be appreciated that the present invention affords a highly improved electric motor tool of extremely light weight, small size, and delicate balance that operates at very high speed and with substantial power. The advantages of such tool have been pointed out hereinbefore, and will otherwise be obvious to those skilled in the art. The tool, due to the particularly advantageous cooling system afforded according to the present invention, is very cool operating and can be held in the bare hands of the tool operator for long periods of time without discomfort. Also, the assembly of the electrical components of the tool insures against any danger of electrical shock. The small nose of the tool accommodates entry of the tool to very small cavities and through very small apertures to broaden the adaptability of the tool. Also, the small nose eliminates obstructions to visual observation and examination of the work being performed by the tool. The prestressing of the bearings, as provided according to the present invention, is particularly economical and practical and eliminates any end play in the shaft to insure precision operation of the tool at all times. The rear bearing assembly for the tool affords substantial advantages in the art by accommodating any axial adjustment necessary between the tool shaft and housing and providing said prestressed condition of the bearings, with the advantages above noted, without incurring any disadvantages as regards mounting of the bearing. The manufacture and assembly of the tool of the invention, while necessarily of an exacting nature, are conveniently carried out, so that the resulting tool is particularly economical when the advantages thereof are considered. Furthermore, the particular assembly of the internal collet, the tie rod, and the provision of means for operating the collet, by instruments described, from the rear of the tool is particularly advantageous, and affords a very convenient assembly. The provision, in conjunction with the collet operating means, of means for automatically ejecting the collet, assures complete convenience in the attachment and detachment of cutting bits to the tool. Also, in view of its small size, the tool of the present invention accommodates the utilization of a single unitary tool shaft and the provision of only two bearings for rotatably supporting the same. Since the bearings are an important cost factor in accurately balanced tools of the character described, utilization of a minimum of bearings is a particularly advantageous feature. However, it is to be appreciated, despite the enumerated advantage, that the features of the present invention are applicable as well to tools of the nature of my earlier developments in the art wherein detachably associated but separate quill and armature shafts were provided.

While I have described and shown what I regard to be a preferred embodiment of my invention, it will be appreciated that various changes, rearrangements and modifications may be made therein without departing from the scope of the invention, as defined by the appended claims.

I claim:

1. In a motor tool, housing means, shaft means rotatable in said housing means, a pair of bearings rotatably supporting said shaft means adjacent the opposite ends of said housing means, each of said bearings including inner and outer races, the inner and outer races of one of said bearings being locked respectively to said shaft means and said housing means, one of the races of the other of said bearings being locked to one of said means, the other one of said means and the other one of the races of said other bearing being slidable with respect to one another to accommodate axial expansion and contraction of said shaft means with respect to said housing means, spring means confined between said other race of said other bearing and said other means to prestress both of said bearings to eliminate shaft end play, and retaining means associated with said other race of said other bearing and said other means, said retaining means being held against rotation with respect to said other means and including at least one portion engaging in an end face only of said other race of said other bearing to retain said other race of said other bearing against rotation with respect to said other means and to accommodate relative sliding movement of the two axially of said shaft means.

2. In a motor tool, housing means, shaft means rotatable in said housing means, a pair of bearings rotatably supporting said shaft means adjacent the opposite ends of said housing means, each of said bearings including inner and outer races, the inner and outer races of one of said bearings being locked respectively to said shaft means and said housing means, one of the races of the other of said bearings being locked to one of said means, the other one of said means and the other one of the races of said other bearing being slidable with respect to one another to accommodate axial expansion and contraction of said shaft means with respect to said housing means, and a resilient retaining member associated with said other race of said other bearing and said other means, said retaining member including at least one portion engaging in an end face only of said other race of said other bearing and at least one portion engaging in said other means to retain said other race of said other bearing against rotation with respect to said other means and to accommodate relative sliding movement of the two axially of said shaft means.

3. In an electric motor tool, a housing a motor field structure mounted in said housing, a shaft rotatable in said housing and including a quill portion extending to the forward end of said housing, a motor armature mounted on said shaft to operate within said field structure, a first bearing rotatably supporting the quill portion of said shaft adjacent the forward end of said housing, said first bearing including an inner race locked to said shaft and an outer race locked in said housing, a second bearing rotatably supporting said shaft rearwardly of said armature, said second bearing including an inner race locked to said shaft and an outer race slidably mounted in said housing to accommodate axial expansion and contraction of said shaft, and a retaining member having portions fixed against rotation with respect to said housing and portions interengaging in an end face only of the outer race of said second bearing to retain said last-named race against rotation with respect to said housing, said member being resilient to accommodate axial expansion and contraction of said shaft without disassociation of said member and the outer race of said second bearing.

4. In an electric motor tool, a housing, a motor field structure mounted in said housing, a shaft rotatable in said housing and including a quill portion extending into the forward end of said housing, a motor armature mounted on said shaft to operate within said field structure, a first bearing rotatably supporting the quill portion of said shaft adjacent the forward end of said housing, said first bearing including an inner race locked to said shaft and an outer race locked in said housing, a second bearing rotatably supporting said shaft rearwardly of said armature, said second bearing including an inner race locked to said shaft and an outer race slidably mounted in said housing to accommodate axial expansion and contraction of said shaft, a spring confined between said housing and the outer race of said second bearing forwardly of said second bearing to bias the outer race of said second bearing rearwardly of the inner race thereof, to bias the inner race of said second bearing and said shaft rearwardly and to bias the inner race of said first bearing rearwardly of the outer race thereof, whereby both of said bearings are prestressed to eliminate end play of said shaft and whereby said shaft is biased rearwardly of said tool to eliminate shaft end play consequent upon application of a tool carried by the quill portion of said shaft to a work piece, and a retaining member confined between said housing and the outer race of said second bearing rearwardly of said second bearing, said member having portions fixed against rotation with respect to said housing and portions engaging the rear end face of the outer race of said second bearing to retain said last-named race against rotation with respect to said housing, said member being resilient but weaker than said spring to accommodate axial expansion and contraction of said shaft and biasing of the outer race of said second bearing by said spring without disassociation of said member and the outer race of said second bearing.

5. In a rotary tool having a housing and a shaft rotatable in the housing, a bearing rotatably supporting the shaft adjacent the forward end thereof, said bearing having an inner race locked with respect to the shaft and an outer race locked with respect to the housing, and a bearing assembly rotatably supporting the shaft adjacent the rearward end thereof, said assembly comprising a bearing having an inner race locked with respect to the shaft and an outer race mounted for sliding movement with respect to the housing, a wave-washer spring confined between the outer race of said bearing and a stationary portion of the housing forwardly of the bearing, and an annular retaining spring having arms interengaging in a stationary portion of the housing rearwardly of said bearing and interengaging in the rear face of the outer race of said bearing to retain the outer race of said bearing against rotation with respect to said housing, said wave-washer spring being stronger than said retaining spring.

6. In a motor tool having a housing and a shaft rotatable in the housing, a rear bearing assembly for the shaft comprising a bearing seat to be secured in the housing, a bearing sleeve secured in said seat and having at least one slot therein, a bearing having an outer race slidably received in said sleeve and an inner race to be locked to the shaft, an annular spring confined between the outer race of said bearing and said sleeve forwardly of said bearing, and a resilient annular retaining spring positioned in said sleeve rearwardly of said bearing, said retaining spring having at least one radially extending arm positioned in said slot in said sleeve and having at least one axially extending finger, the outer race of said bearing having at least one recess in the rear face thereof for the reception of said axially extending finger, whereby said retaining spring retains the outer race of said bearing against rotation with respect to said sleeve and the housing and accommodates axial movement of said outer race in said sleeve with respect of the housing.

7. In a motor tool, a housing, a hollow shaft rotatable in said housing and including a quill portion extending to the forward end of said housing, said shaft having a tapered bore at the forward end thereof, a hollow taper collet received in said tapered bore, a tie rod threaded to said collet and extending through said shaft to the rearward end thereof, said rod having a head operatively engageable with the rearward end of said shaft and being threadable into said collet to exert a compressive force on said shaft to draw said collet into locking engagement in said tapered bore, and an abutment on said housing engageable by the head of said rod upon unthreading of said rod and said collet to eject said collet from locking engagement in said tapered bore.

8. In a motor tool, a housing, a tubular shaft rotatable in said housing and including a quill portion extending to the forward end of said housing, said shaft having a tapered bore at the forward end thereof, a tubular taper collet positioned in said tapered bore, a tie rod threaded to said collet and extending through said shaft to the rearward end thereof, said rod having a head operatively engageable with the rearward end of said shaft and being threadable into said collet to exert a compressive force on said shaft to draw said collet into locking engagement in said tapered bore, said housing including a cover closing the rearward end thereof and enclosing said shaft and rod, and a tubular abutment on said cover coaxial with said rod and engageable by the head of said rod upon unthreading of said rod with respect to said collet to eject said collet from locking engagement in said tapered bore, said abutment accommodating the passage therethrough of a wrench to engage the head of said rod to effect threading and unthreading of said rod with respect to said collet.

9. In a motor tool, a housing, a tubular shaft rotatable in said housing, a pair of bearings rotatably supporting said shaft adjacent the opposite ends of said housing, each of said bearings including inner and outer races, the bearing adjacent the forward end of said housing having the inner and outer races thereof locked respectively to said shaft and said housing, said shaft at the forward end thereof having a tapered bore, a tubular taper collet positioned in said tapered bore, and a tie rod threaded to said collet and extending through said shaft beyond the rearward end thereof, said shaft including an abutment adjacent the rearward end thereof, the inner race of the other one of said bearings being mounted on said shaft and engaging said abutment at the forward side thereof, said rod having a head thereon engageable with the rearward side of the inner race of said other bearing, upon threading of said rod into said collet, to lock the inner race of said other bearing to said shaft and to exert a compressive force on said shaft to draw said collet into locking engagement in said tapered bore, the outer race of said other bearing being slidably received within said housing to accommodate thermal expansion and contraction of said shaft with respect to said housing.

10. In a motor tool, a housing, a tubular shaft rotatable in said housing, a pair of bearings rotatably supporting said shaft adjacent the opposite ends of said housing, each of said bearings including inner and outer races, the bearing adjacent the forward end of said housing having the inner and outer races thereof locked respectively to said shaft and said housing, said shaft at the forward end thereof having a tapered bore, a tubular taper collet positioned in said tapered bore, a tie rod threaded to said collet and extending through said shaft beyond the rearward end thereof, said shaft including an abutment adjacent the rearward end thereof, the inner race of the other one of said bearings being mounted on said shaft and engaging said abutment at the forward side thereof, said rod having a head thereon engageable with the rearward side of the inner race of said other bearing, upon threading of said rod into said collet, to lock the inner race of said other bearing to said shaft and to exert a compressive force on said shaft to draw said collet into locking engagement in said tapered bore, the outer race of said other bearing being slidably received within said housing to accommodate thermal expansion and contraction of said shaft with respect to said housing, and a spring confined between the outer race of said other bearing and said housing to prestress both of said bearings when said rod is tightened in said collet.

11. An electric motor tool comprising a housing, a motor field structure mounted in said housing intermediate the ends thereof, a shaft mounted for rotation in said housing, an armature mounted on said shaft to operate within said field structure, said housing including a forward end portion, a first bearing including an outer race locked in said portion of said housing and an inner race locked to said shaft adjacent the forward end thereof, a bearing seat secured in said housing rearwardly of said armature and said field structure, a second bearing having an inner race locked to said shaft adjacent the rearward end thereof and an outer race slidably mounted in said bearing seat, a spring confined between the outer race of said second bearing and said bearing seat forwardly of said second bearing to bias the outer race of said second bearing rearwardly with respect of the inner race thereof, to bias the inner race of said second bearing and said shaft rearwardly of said housing, and to bias the inner race of said first bearing rearwardly with respect of the outer race thereof to eliminate shaft end play, and a retaining member disposed rearwardly of said second bearing and having portions thereof engaging in said bearing seat and portions thereof engaging in the rear face only of the outer race of said second bearing to retain the outer race of said second bearing against rotation with respect to said bearing seat and said housing.

12. An electric motor tool as set forth in claim 11, wherein said shaft is hollow and provided with a tapered bore at the forward end thereof, a tubular collet positioned in said tapered bore, and a tie rod threaded to said collet and extending through said shaft beyond the rearward end thereof, said tie rod having a head engageable with the inner race of said second bearing and being threadable into said collet to exert a compressive force on the inner race of said second bearing to lock said second bearing to said shaft and to exert a compressive force on said shaft to draw said collet into locking engagement in said tapered bore in said shaft.

13. A high-speed electric motor tool comprising a generally cylindrical housing, a generally cylindrical motor field structure mounted in said housing intermediate the ends thereof, said field structure having a plurality of longitudinally extending circumferentially spaced depressions in the peripheral wall thereof to define air ducts between said field structure and said housing extending from one end of said field structure to the other, a shaft mounted for rotation in said housing, an armature mounted on said shaft to operate within said field structure, said armature and said field structure defining a generally annular gap therebetween, said housing including an inwardly tapering nose portion of substantial section, a first bearing mounted in said nose portion of said housing and rotatably supporting said shaft adjacent the forward end thereof, a fan mounted on said shaft forwardly of said field structure between said first bearing and said armature, a generally cylindrical bearing seat of substantial section secured in said housing rearwardly of said armature and said field structure, a second bearing mounted in said bearing seat and rotatably supporting said shaft adjacent the rearward end thereof, said bearing seat having generally longitudinally extending ports therein disposed in an annular path about said second bearing, said housing having inlet ports in the rearward end thereof and generally radially opening inlet ports therein between said bearing seat and said field structure, said fan including blades inclined to the plane of rotation of the fan, said housing and the tapered nose portion thereof having a plurality of generally longitudinally extending outlet ports disposed in an annular path about said first bearing, said ports merging with the inner wall of the portion of said housing enclosing said fan and being tapered to define a path of air flow normal to the blades of said fan, a commutator mounted on said shaft rearwardly of said armature, and brushes extending radially through said bearing seat and engaging said commutator, said ports in said nose portion of said housing being arcuately offset with respect to said brushes, said fan being rotated with said shaft upon electrical energization of said armature and said field to draw air through said inlet ports in the rearward end of said housing through said ports in said bearing seat, through said inlet ports in said housing between said bearing seat and said field structure, through said ducts between said field structure and said housing and through said annular gap between said field structure and said armature and to discharge air through said ports in said nose portion of said housing in large volume and at great speed, whereby heat generated by said bearings is dissipated by transmission of heat through the substantial section of the mountings thereof and cooling of the mountings by air flow therethrough, and whereby heat generated by the field and armature of the motor is dissipated by air flow through the annular gap therebetween and through the ducts between said field structure and said housing thus to cool the tool as a whole and prevent substantial transmission of heat to said housing.

References Cited in the file of this patent
UNITED STATES PATENTS

| | | |
|---|---|---|
| 560,347 | Davis et al. | May 19, 1896 |
| 1,892,997 | Oldenburg | Jan. 3, 1933 |
| 1,912,201 | Huck | May 30, 1933 |
| 2,188,251 | Nelson | Jan. 23, 1940 |
| 2,218,168 | Hedgepath | Oct. 15, 1940 |
| 2,239,629 | Sievert et al. | Apr. 22, 1941 |
| 2,242,475 | Misuraca | May 20, 1941 |
| 2,396,760 | Thomas | Mar. 19, 1946 |
| 2,452,268 | Schuman | Oct. 26, 1948 |